United States Patent [19]
Hyslop

[11] Patent Number: 5,502,921
[45] Date of Patent: Apr. 2, 1996

[54] MOWING GUARD

[76] Inventor: William P. Hyslop, 119 Browning Trail, Barrie, Ontario, Canada, L4N 6R2

[21] Appl. No.: 383,395

[22] Filed: Feb. 3, 1995

[51] Int. Cl.⁶ ................................................ A01G 17/00
[52] U.S. Cl. ............................................................. 47/25
[58] Field of Search .................................. 47/33, 25, 24, 47/9 S

[56] References Cited

U.S. PATENT DOCUMENTS

| | | | |
|---|---|---|---|
| 2,978,837 | 4/1961 | Daniels | 47/25 |
| 3,571,972 | 3/1971 | Carter, Jr. | 47/25 |
| 3,955,319 | 5/1976 | Smith | 47/9 S |
| 4,268,992 | 5/1981 | Scharf, Sr. | 47/23 |
| 4,831,776 | 5/1989 | Fritch | 47/9 S |
| 5,058,317 | 10/1991 | McMurtrey | 47/25 |
| 5,265,374 | 11/1993 | Crane | 47/33 |
| 5,325,627 | 7/1994 | Anderson | 47/25 |

*Primary Examiner*—Henry E. Raduazo
*Attorney, Agent, or Firm*—Ridout & Maybee

[57] ABSTRACT

A mowing guard has a band element that forms a side wall of a tray-like container disposed on the ground about the base of a tree trunk, lamp post, utility pole, fire hydrant or like upstanding element. A bottom as constituted by drapeable sheet material inhibiting of growth of plant material connected to a lower edge of the side wall. The drapeable sheet has an opening conforming to the tree trunk or other element and extending to an opening in the side wall allowing the guard to be installed around the tree trunk or other element. The drapeable material is disposed to form a substantially continuous plant growth inhibitive covering between the tree trunk or other element and the wall element. The container may be filled with mulch material.

20 Claims, 3 Drawing Sheets

MOWING GUARD

The present invention relates to a mowing guard. It is known to provide tree guards which are intended to be placed on the ground around the base of a tree trunk for the purpose of discouraging growth of grass and weeds around the tree trunk, and serving to protect the tree from mower impact damage as a result of attempts to mow grass and weeds around the tree trunk base. Similar guards may also be applied around fire hydrants, utility poles, lamp posts and other upstanding elements normally located in expanses of grass or the like.

The applicant is aware of various prior proposals for such guards, but the prior structures of which applicant is aware are relatively complex and expensive to manufacture and are not as efficient as is desirable in discouraging weed, grass or other plant growth and in protecting tree trunks and other items from mower impact damage.

In accordance with the present invention there is provided a mowing guard comprising a stiff band element having ends, means for connecting together said ends and adapted to form said band into an endless upstanding wall element adapted to be placed on the ground around an upstanding element such as a tree trunk, and a ground covering element connected to an edge of said band that forms a lower edge of said wall element and having at least one discontinuity extending from adjacent said ends to a middle portion of the covering element for accommodating the upstanding element therethrough, said ground covering element comprising drapeable sheet material inhibitive of the growth of plant material therethrough and adapted to be disposed to form a plant growth inhibitive covering extending substantially continuously between the upstanding element and said wall element.

This structure is adapted to form a tray-like container disposed on the ground about the base of the tree trunk or other upstanding element, with the wall element defining a side wall of the container and the bottom of the container constituted by the drapable sheet material disposed to form a substantially continuous plant growth inhibitive covering between the upstanding element and the wall element. Such container may be filled with mulch material, in order to further inhibit plant growth, serve as a physical buffer between the wall element and the upstanding element, tend to reinforce the wall element, absorb impact forces resulting from the incidence of mowing apparatus on the outside of the wall element, and provide an aesthetically attractive appearance.

A mowing guard in accordance with the invention will be described in more detail, by way of example only, with reference to the accompanying drawings.

Figure 1:
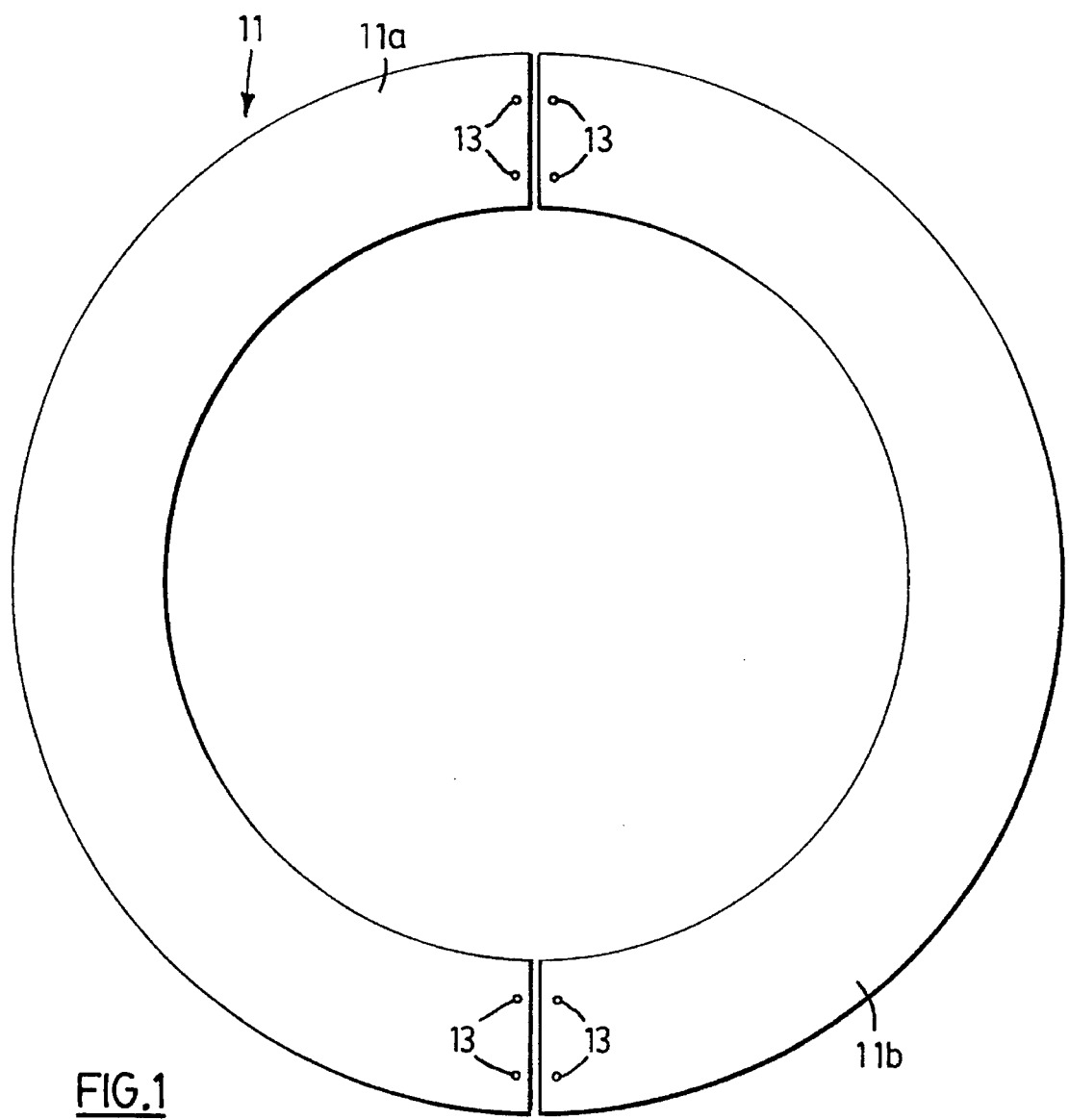
FIG. 1 shows a plan view of band elements adapted to form a wall element of a mowing guard in accordance with the invention.
Figure 6:
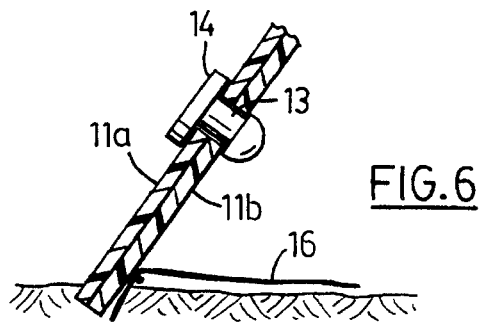
FIG. 6 is a cross-section on an enlarged scale showing the connecting means for the wall element of the guard.

Referring to the drawings, a mowing guard 10 comprises a stiff band element 11 which is adapted to surround or encircle the base of a tree trunk. In the example illustrated, the band element 11 is adapted to form a frusto-conical wall element 12 in its installed and assembled form. In the example shown, the band element 11 comprises two part semi-circular portions 11a and 11b, as seen in plan view in FIG. 1, formed with small openings 13 through adjacent ends, whereby the overlapped ends can be connected together using snap-in fastening elements 14 as seen in more detail in FIGS. 4 and 6 passed through the openings 13. Such snap-through connector elements are in themselves conventional and their application need not be described in detail herein. The band element may be a single piece, however, or may be formed from more than two elements joined together.

Figure 2:
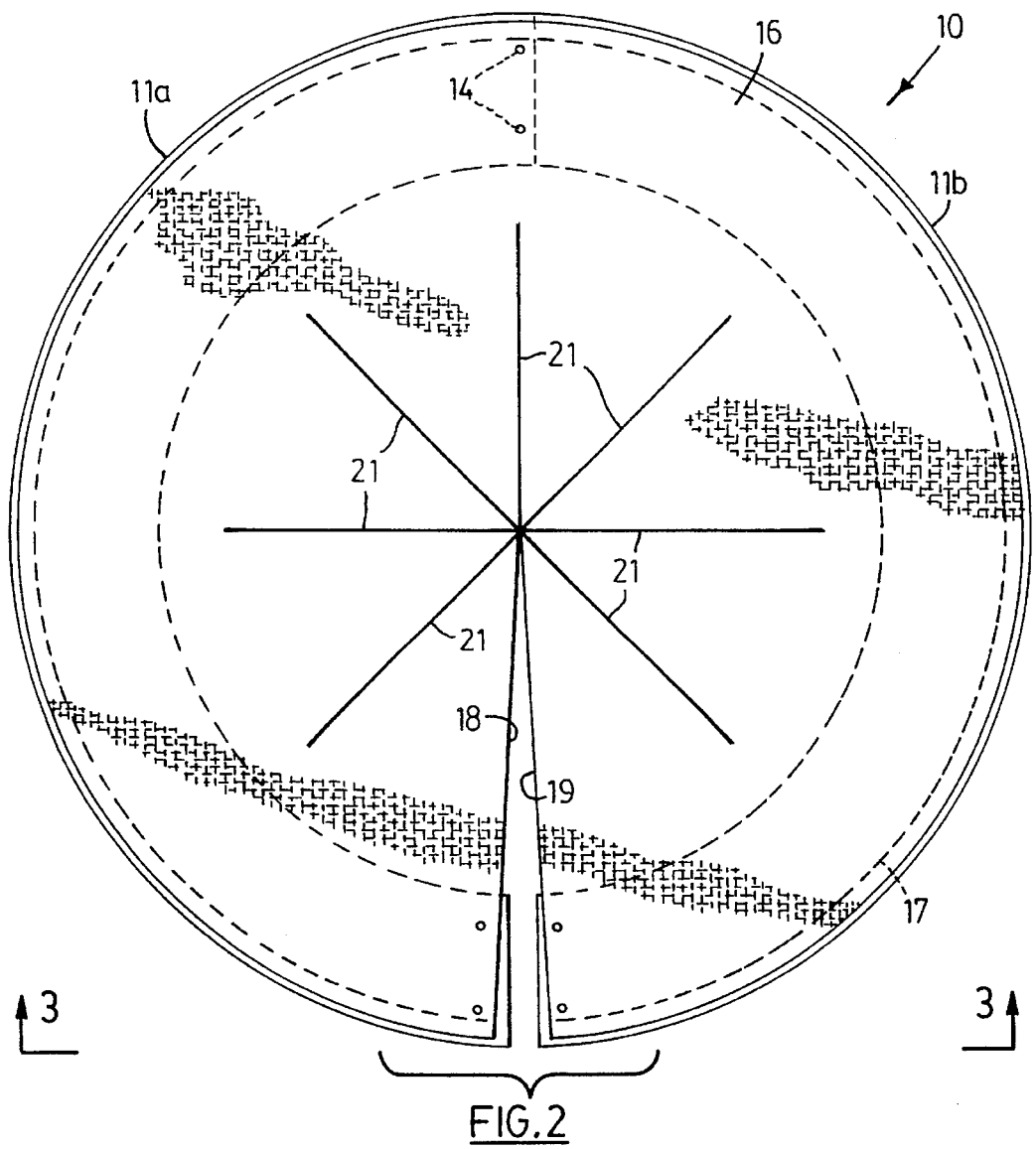
FIG. 2 is a bottom view of the completed mowing guard, with a side of the guard open to allow installation around a tree trunk or like upstanding element.
Figure 3:
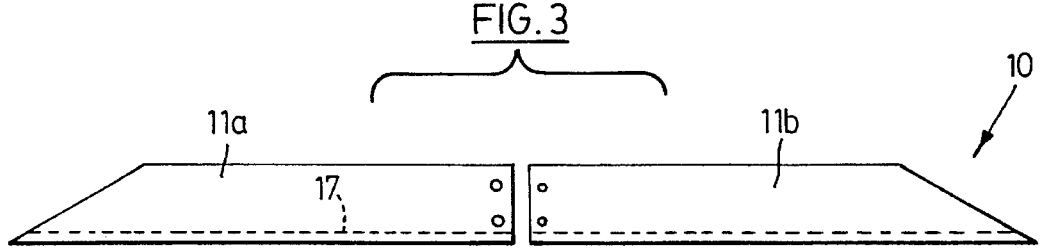
FIG. 3 is a side view taken on the line FIG. 3 of FIG. 2.

In manufacture of the mowing guard, one end of a portion 11a is overlapped with an adjacent end of the other portion 11b and fastened together using fastening elements 14, as seen in FIG. 2 and a circular piece of sheet material 16 is attached to the assembly of the part circular elements 11a and 11b, for example by sewing, along a line 17 slightly inset from the lower edge of the elements 11a and 11b. The sheet material 16 has a discontinuity, for example a slit or opening, bordered by edges 18 and 19, that extends from adjacent the opening defined by the free ends of the portions 11a and 11b to approximately the centre of the sheet. Further, in the preferred form, the material has a series of slits 21 extending from the central portion of the material 16, the slits 21 and discontinuity 18 and 19 defining between them sector shaped sheet material portions 23 extending inwardly from adjacent the periphery of the material 16.

The material 16 is a drapable sheet material that, in use, tends to inhibit plant growth through it. For example, the sheet material may be conventional landscaping fabric that is pervious to air and moisture but is impervious to plant seeds, so that grass seeds or the like will not penetrate downwardly through the fabric and will not tend to germinate. Preferably, however, the sheet material 16 is a substantially impervious sheet plastic film material, for example a polyethylene film, such as a clear polyethylene film, that will not only prevent penetration of grass or weed seeds or the like downwardly into the soil adjacent the base of the tree trunk or other element around which the guard is to be applied, but may also serve to inhibit growth of plant material in the region covered by the sheet, for example as a result of encroachment of grass or weeds inwardly under the mowing guard from the region of the ground immediately adjacent the exterior of the mowing guard.

Figure 4:
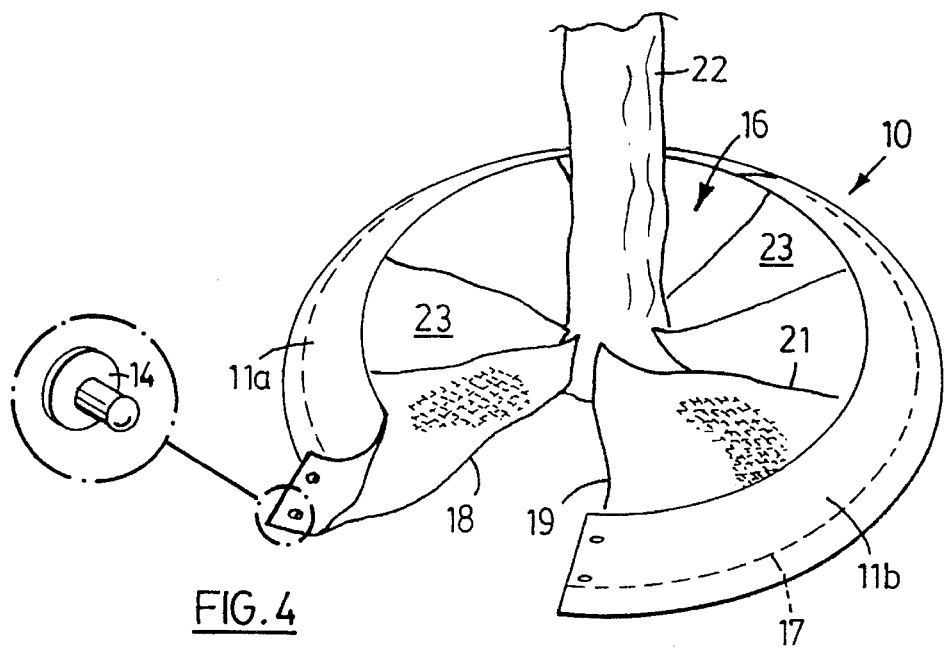
FIG. 4 is a perspective view showing the mowing guard in the course of installation around a tree trunk.
Figure 5:
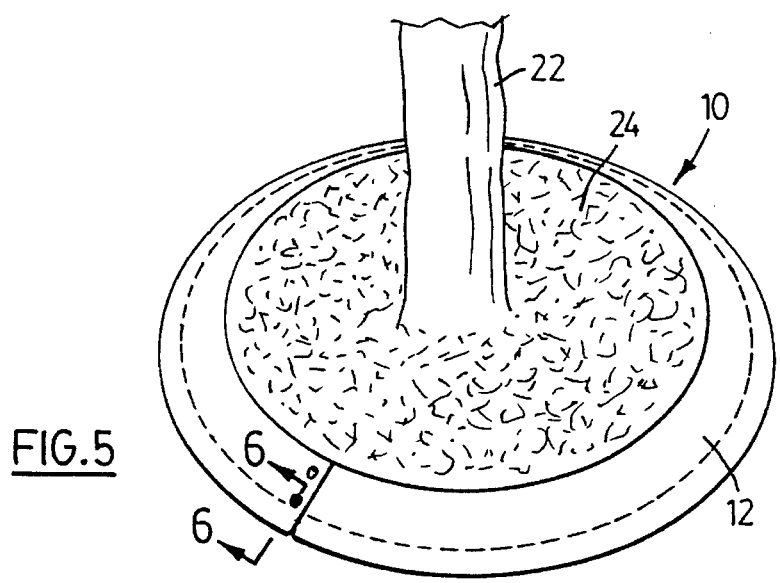
FIG. 5 is a respective view showing the installed guard filled with mulch material.

In use, in the example shown in FIG. 4, the mowing guard 10 is placed around the base of a tree trunk 22. It will be appreciated that the guard may, however, be applied around a fire hydrant, utility pole, lamp post or like upstanding element. The sector shaped pieces 23 defined between the slits and the discontinuity 18 and 19 are if necessary draped and arranged over one another so that their edges overlap and overlap on the side of the tree trunk 22 or other element. When the initially free ends of the pieces 11a and 11b are drawn together, overlapped and fastened with the fastener elements 14, the edges 18 and 19 overlap so that there is a substantially complete covering of the ground surface by the sheet material 16 between the tree trunk 22 or other element and the wall element 12 formed by the joined pieces 11a and 11b. In its assembled form, the mowing guard therefore provides a tray-like container having a side wall 12 and a bottom formed by the overlapped portions of the fabric 16. Into this container may be placed mulch material, for example organic mulch material, such as bark chips, shredded wood fibres, or the like, or inorganic mulch, such as gravel, stone chippings, crushed brick particles or the like. The guard may also be filled with concrete or the like. The material 24 as seen in FIG. 5 serves to stabilize or anchor the mowing guard in place, by virtue of its weight, and serves further to inhibit plant growth around the base of the tree, and can also serve as a highly effective physical buffer between the wall element 12 and the tree trunk 22 or other element, and tending to reinforce the wall element 22 against deflection inwardly. Further, the mulch or other material 24 can absorb impact forces resulting from a mower or like mowing apparatus striking the outside of the wall element. Further, the mulch or other material 24 provides an aesthetically attractive appearance.

Preferably, the band elements 11a and 11b forming the wall 12 are relatively stiff, and may be formed of plastic material of thicker gauge than the film 16. Preferably, the elements 11a and 11b are stamped or cut out of heavy gauge ultraviolet resistant high density polyethylene sheet.

Various modifications or variations of the mowing guard structure are of course possible. For example, instead of the mowing guard being essentially circular in plan, it could be square, rectangular, oval, triangular or of other configuration. For example, the wall element 12 could be a four-sided generally square structure with upwardly inwardly sloping walls, somewhat in the fashion of a squat truncated pyramidal structure, being closed on three sides and having an opening on a fourth side, and having a generally square piece of the drapeable fabric 16 connected along its lower side. As with the structure shown in detail in FIGS. 2 to 6 of the accompanying drawings, such drapeable sheet material 16 would carry slits and have an opening extending to adjacent the opening of the open fourth side, so that the wall element can be installed around a tree trunk or other element and the drapeable sheet material elements arranged to form a substantially complete covering between the tree trunk or other element and the wall element.

Preferably, the wall element inclined inwardly upwardly, to assist in retaining the mulch material and providing a smoother transition between the ground surface and the mowing guard. It would, however, equally be possible to employ a guard having a vertically upstanding side wall. For example, the side wall could be formed by a single band element joined together end to end to form a squat cylindrical structure. Various other modifications and variations will occur to those of ordinary skill in the art.

I claim:

1. In combination, a mowing guard resting freely on a ground surface about an element upstanding from the ground surface, said mowing guard comprising a stiff band element having ends, means connecting together said ends and thereby forming said band into an endless upstanding wall element disposed on the ground around said upstanding element, a ground covering element connected to an edge of said band that forms a lower edge of said wall element and having at least one discontinuity extending from adjacent said ends to a middle portion of the covering element and accommodating the upstanding element therethrough, said ground covering element comprising drapeable sheet material inhibitive of the growth of plant material therethrough and disposed to form a plant growth inhibitive covering extending substantially continuously between said upstanding element and said wall element, and particulate mulch material disposed within said wall element on said ground covering element, the weight of said mulch material serving to stabilize the mowing guard against movement relative to the ground surface.

2. The combination as claimed in claim 1 wherein said connecting means are adapted to connect said ends in overlapping relationship and portions of said sheet material on either side of said discontinuity are adapted to overlap when the ends of the band overlap.

3. The combination as claimed in claim 1 wherein said at least one discontinuity comprises a plurality of slits radiating from the middle portion toward said edge of the band.

4. The combination as claimed in claim 1 wherein said wall element inclines inwardly upwardly.

5. The combination as claimed in claim 4 wherein said band is part circular and is adapted to form a frusto-conical wall element and said covering element is generally circular.

6. The combination as claimed in claim 5 wherein said band comprises two part semi-circular pieces joined together end to end.

7. The combination as claimed in claim 1 wherein said endless wall element is relatively wide in relation to its height.

8. The combination as claimed in claim 1 wherein said drapeable sheet material comprises sheet plastic material.

9. The combination as claimed in claim 8 wherein said plastic is polyethylene.

10. The combination as claimed in claim 1 wherein said band element comprises stiff sheet plastic material.

11. The combination as claimed in claim 10 wherein said plastic comprises high density polyethylene.

12. In combination, a mowing guard resting freely on a ground surface about an element upstanding from the ground surface, said mowing guard comprising a tray-like container disposed on the ground about the base of said upstanding element and comprising a stiff upstanding endless wall element defining a side wall of the container and a bottom of the container constituted by drapeable sheet material inhibitive of growth of plant material therethrough connected to a lower edge of said side wall, said sheet material having an opening conforming to the upstanding element and disposed to form a substantially continuous plant growth inhibitive covering between the upstanding element and the wall element, said container filled with particulate mulch material, and the weight of said mulch material serving to stabilize the mowing guard against movement relative to the ground surface.

13. The combination as claimed in claim 12 wherein said side wall is relatively shallow in relation to the width of the container.

14. The combination as claimed in claim 12 wherein said side wall has a gap and means for closing the gap, and said sheet material has said opening extending from the gap to a middle portion thereof.

15. The combination as claimed in claim 12 wherein said opening comprises a plurality of slits radiating from the middle portion toward said side wall.

16. The combination as claimed in claim 12 wherein said side wall inclines inwardly upwardly.

17. The combination as claimed in claim 16 wherein said side wall is a frusto-conical.

18. The combination as claimed in claim 17 wherein said side wall comprises two part semi-circular pieces joined together end to end.

19. The combination as claimed in claim 12 wherein said drapeable sheet material comprises sheet plastic.

20. The combination as claimed in claim 19 wherein said plastic is polyethylene.

* * * * *